May 30, 1950 J. A. KLOD 2,509,976
CUTTER BLADE AND A HOLDER THEREFOR
Filed June 15, 1949
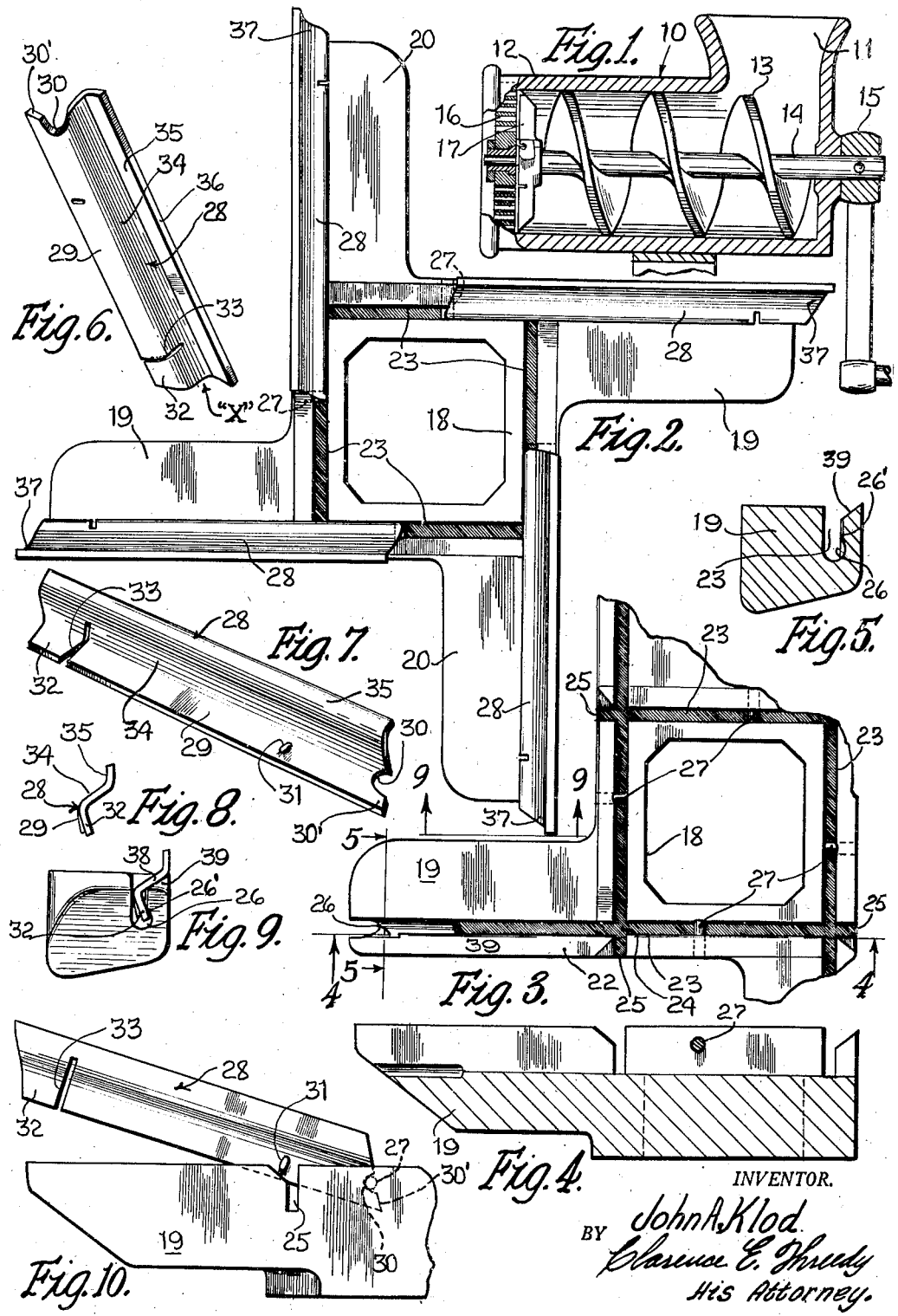
INVENTOR.
John A. Klod
BY Clarence E. Threedy
His Attorney.

Patented May 30, 1950

2,509,976

UNITED STATES PATENT OFFICE 2,509,976

CUTTER BLADE AND A HOLDER THEREFOR

John A. Klod, Chicago, Ill.

Application June 15, 1949, Serial No. 99,236

7 Claims. (Cl. 146—189)

My invention relates to certain new and useful improvements in cutter blades and a holder therefor especially adapted for use in connection with meat grinders and the like. As such the invention has for its principal object the provision of an improved and simplified construction which will be efficient in use and economical in manufacture.

An important object of my invention is the provision of an arrangement for connecting and mounting the cutting blades with respect to the holder without the employment of screws or other like elements, the arrangement facilitating the removal of the cutting blades quickly and without the use of tools thereon other than an instrument for striking a portion of the cutting blade to dislodge it from attached position with respect to the holder.

Another and equally important object of the invention is the provision of a cutter blade in which the mounting shank is offset below and laterally in parallel relation with respect to the cutting edge of the blade, thereby to present a cutting blade having a relatively wide shank which permits the blade to be frequently sharpened without destroying its usefulness, thus providing a cutting blade having exceptional longevity.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a longitudinal sectional detail view depicting a conventional meat grinder having associated therewith my improved cutting elements and holder;

Fig. 2 is an elevational view illustrating my improved holder with the cutting elements in mounted position with respect thereto;

Fig. 3 is a fragmentary view of the holder shown in Fig. 2 with the blades removed therefrom;

Fig. 4 is a sectional detail view taken substantially on line 4—4 of Fig. 3;

Fig. 5 is a sectional detail view taken substantially on line 5—5 of Fig. 3;

Fig. 6 is a perspective view of one of the cutting blades embodied in the invention;

Fig. 7 is a perspective view of the blade illustrated in Fig. 6 viewed from the opposite side;

Fig. 8 is an end view of the blade illustrated in Fig. 6 looking in the direction of the arrow X;

Fig. 9 is an end view taken substantially on line 9—9 of Fig. 2; and

Fig. 10 is a fragmentary view of the holder showing the first step in the operation of mounting the cutting blade thereon.

The several objects of my invention are accomplished by the preferred form of construction illustrated in the accompanying drawings and in which drawings a conventional meat grinder is indicated at 10. This meat grinder includes a mouth portion 11 through which the material to be ground may be introduced into the relatively elongated grinding chamber 12. A feed screw 13 is arranged on a shaft 14 having an operating handle 15 for feeding the meat introduced through the mouth into the grinding chamber toward the grinding blades, which grinder blades cooperate with a perforated plate 16 mounted at the discharge end of the grinding chamber 12.

My improved holder is indicated at 17 and includes a hub 18 of rectangular formation and mounted in the conventional manner upon the shaft 14 to present to the perforated plate 16 the cutting blades. Extending from this hub are radially disposed arms 19 and 20, the arms 19 being offset with respect to each other and extending substantially at right angles with respect to the arms 20, which, like the arms 19, are likewise offset with respect to each other.

In the lead side edge portion 22 of each arm there is formed an elongated groove 23, with the groove 23 of one arm bisecting as at 24 the groove of an adjacent arm, to provide an open slot 25. The outer end portions of the groove 23 of each arm terminate into an undercut recess 26.

Carried by the hub 18 and traversing each of the grooves 23 is a pin 27 which serves as a fulcrum for the cutting blades 28 now to be described.

Each of these cutting blades is formed from an elongated strip of material and each provides a shank 29. The inner end portion of this shank 29 provides a semi-circular recess 30 which is adapted to receive the pin 27 to complete the fulcrum connection between the blade and the pin 27, facilitating the mounting of the shank 29 in its groove 23 in a manner to be presently explained.

This end portion of the shank 29 also provides a laterally extending lug 31 which may be formed by striking the same from the shank 29. The opposite end portion of the shank 29 provides a latch lip 32. This latch lip 32 is provided by forming in the shank 29 a slit 33 which extends less than the complete distance across the blade. That portion of the shank providing the latching lip 32 is bent from alignment with the shank 29 so that the latching lip 32 will be offset with respect to the shank 29 for reasons presently pointed out.

The blade 28 further provides an intermediate web 34 which integrally connects the shank 29 with a flange 35, the outer edge 36 of which is ground or otherwise sharpened to provide a cutting edge. As this flange is of a substantial width, it will be apparent that the cutting edge 36 may be ground frequently, thereby prolonging its longevity.

Each blade 28 is mounted in its respective groove 23 in the following manner:

The end portion of the blade providing the recess 30 is projected into the groove 23 to dispose the blade 28 at an angle with respect to the arm in which the groove is formed, this disposing the adjacent pin 27 in the recess 30 whereby to provide a fulcrum connection between the blade 28 and the pin 27. The blade 28 is then pivoted about the pin 27 to bring the latching lip into position above the undercut recess 26. In this position of the blade 28 with respect to its supporting arm, the pin 27 will be disposed in the recess 30 and a latching finger 30' will be disposed beneath the pin 27 and the latching lip 32 ready to be sprung through the outer end portion of the groove 23, to be sprung into the undercut recess 26. This is accomplished by striking the outer end of the blade with a suitable mallet or other instrument, such for example the wooden handle portion of a knife or the like. By striking the outer end of the blade with such instrument, the blade 28 is pivoted about its pin 27 and the latch lip 32 forced through the groove 23 to a position beneath the ledge 26' of the undercut recess 26.

In this position the blade is firmly held in position, prevented from lateral displacement from the groove 23 by reason of the latching lip 32 engaging the ledge 26' of the undercut recess 26 and by the engagement of the latching finger 30' beneath the pin 27. The blade 28 is also prevented from moving longitudinally within the groove 23 by reason of the engagement of the projection or lug 31 in the slot 25.

The outer end 37 of each blade projects beyond the outer end of each arm so as to present a portion of the blade which may be struck on the side opposite the cutting edge 26 thereof by the hereinbefore referred to mallet or other instrument, to spring the latching lip 32 from its latched position within the undercut recess 26, thereby to facilitate removal of the blade 28 from its respective arm.

The intermediate portion 34 which connects the flange 35 with the shank 29 is curved in cross section to dispose the cutting edge 36 offset laterally with respect to the shank 29 to provide an inclined surface 38 on the blade for bearing engagement with a tapered portion 39 of the arm with which the blade is associated. This arrangement strengthens the blade and restrains the same from vibrating or chattering during the cutting operation of the meat.

From the foregoing description, it is apparent that my improved blade may be mounted in a position upon its holder arm without the use of connecting elements such as screws, bolts or other like elements, and that by a simple operation of striking the blade by a suitable instrument the blade may be mounted in the groove or quickly and easily removed therefrom.

The present invention constitutes an improvement over that disclosed in my prior patents, Nos. 1,869,218, 1,869,219 and 1,869,220.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. The combination with a blade holder for a grinding machine in which the holder is provided with a blade receiving groove having at one end an undercut recess and a pin extending transversely of the groove at the opposite end of the groove from the recess, of a blade adapted to be mounted in said groove comprising a shank portion providing a recess for the reception of said pin to provide a fulcrum connection between the blade and the holder, said blade providing at its end opposite the end providing said recess a latching lip adapted for yieldable engagement in said undercut recess when said shank is mounted in said groove, and a cutting edge provided by said blade opposite said shank.

2. The combination with a blade holder for a grinding machine in which the holder is provided with a blade receiving groove having at one end an undercut recess and a pin extending transversely of the groove at the opposite end of the groove from the recess, of a blade adapted to be mounted in said groove comprising a shank portion providing a recess for the reception of said pin to provide a fulcrum connection between the blade and the holder, said blade providing at its end opposite the end providing said recess a latching lip adapted for yieldable engagement in said undercut recess when said shank is mounted in said groove, and a cutting edge provided by said blade opposite said shank, said cutting edge being integrally connected with said shank by an intermediate portion curved in cross section to dispose the cutting edge in a plane offset with respect to the shank.

3. The combination with a blade holder for a grinding machine in which the holder is provided with a blade receiving groove having at one end an undercut recess and a pin extending transversely of the groove at the opposite end of the groove from the recess, of a blade adapted to be mounted in said groove comprising a shank portion providing a recess for the reception of said pin to provide a fulcrum connection between the blade and the holder, said blade providing at its end opposite the end providing said recess a latching lip adapted for yieldable engagement in said undercut recess when said shank is mounted in said groove, and a cutting edge provided by said blade opposite said shank, said latching lip being severed from said shank by a slit and being offset laterally with respect to said shank.

4. The combination with a blade holder for a grinding machine in which the holder is provided with a blade receiving groove having at one end an undercut recess and a pin extending transversely of the groove at the opposite end of the groove from the recess, of a blade adapted to be mounted in said groove comprising a shank portion providing a recess for the reception of said pin to provide a fulcrum connection between the blade and the holder, said blade providing at its end opposite the end providing said recess a latching lip adapted for yieldable engagement in said undercut recess when said shank is mounted in said groove, and a cutting edge provided by said blade opposite said shank, said cutting edge being integrally connected with said shank by an intermediate portion curved in cross section to dispose the cutting edge in a plane offset with respect to the shank, said latching lip being severed from said shank by a slit and being offset laterally with respect to said shank.

5. For a combination comprising a holder for a meat grinder, said holder having an elongated groove formed therein with the outer end portion of the groove terminating into an undercut recess, a blade having a shank portion mounted in said groove and a yieldable latching lip adapted to yieldably engage in said undercut recess, said latching lip being offset laterally with respect to said shank to effect yieldable connection between the blade and said holder when said latching lip is positioned in said undercut recess, and means provided by said holder and said blade to hold said blade and said latching lip from longitudinal displacement from said groove.

6. For a combination comprising a holder for a meat grinder, said holder having an elongated groove formed therein with the outer end portion of the groove terminating into an undercut recess, a blade having a shank portion mounted in said groove, and a yieldable latching lip adapted to yieldably engage in said undercut recess, said latching lip being offset laterally with respect to said shank to effect yieldable connection between the blade and said holder when said latching lip is positioned in said undercut recess, and means providing a fulcrum connection between said blade and said holder to facilitate pivoting said blade in a direction to dispose said shank and said latching lip in said groove and undercut recess respectively.

7. For a combination comprising a holder for a meat grinder, said holder having an elongated groove formed therein with the outer end portion of the groove terminating into an undercut recess, a blade having a shank portion mounted in said groove and a yieldable latching lip adapted to yieldably engage in said undercut recess, said latching lip being offset laterally with respect to said shank to effect yieldable connection between the blade and said holder when said latching lip is positioned in said undercut recess, means provided by said holder and said blade to hold said blade and said latching lip from longitudinal displacement from said groove and means providing a fulcrum connection between said blade and said holder to facilitate pivoting said blade in a direction to dispose said shank and said latching lip in said groove and undercut recess respectively.

JOHN A. KLOD.

REFERENCES CITED

The following references are of record in the file of this patent:

UNITED STATES PATENTS

| Number | Name | Date |
| --- | --- | --- |
| 1,651,856 | Weiss | Dec. 6, 1927 |
| 1,879,279 | Jahn | Sept. 27, 1932 |
| 2,173,366 | Klod | Sept. 19, 1939 |
| 2,196,455 | Klod | Apr. 8, 1940 |